(12) United States Patent
Brabson (10) Patent No.: US 8,660,143 B2
(45) Date of Patent: Feb. 25, 2014

(54) DATA PACKET INTERCEPTION SYSTEM

(75) Inventor: Roy Frank Brabson, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 510 days.

(21) Appl. No.: 13/021,999

(22) Filed: Feb. 7, 2011

(65) Prior Publication Data

US 2012/0201142 A1     Aug. 9, 2012

(51) Int. Cl.
*H04J 3/16* (2006.01)
(52) U.S. Cl.
USPC ............................................................ 370/471
(58) Field of Classification Search
USPC .................. 370/465–475, 489–498; 709/245, 709/201–203, 206; 718/100, 101
See application file for complete search history.

(56) References Cited

U.S. PATENT DOCUMENTS

| 7,088,727 | B1 | 8/2006 | Short et al. | |
| 7,570,663 | B2 | 8/2009 | Jungck | |
| 7,624,142 | B2 | 11/2009 | Jungck | |
| 2003/0048804 | A1* | 3/2003 | Inouchi et al. | 370/466 |
| 2003/0110292 | A1* | 6/2003 | Takeda et al. | 709/245 |
| 2004/0100976 | A1* | 5/2004 | Chang et al. | 370/401 |
| 2004/0194106 | A1* | 9/2004 | Ogawa | 718/100 |
| 2005/0060583 | A1 | 3/2005 | Lin | |
| 2006/0215649 | A1* | 9/2006 | Morrall et al. | 370/389 |
| 2007/0094411 | A1* | 4/2007 | Mullane et al. | 709/245 |
| 2010/0103837 | A1 | 4/2010 | Jungck et al. | |

* cited by examiner

*Primary Examiner* — Kwang B Yao
*Assistant Examiner* — Juvena Loo
(74) *Attorney, Agent, or Firm* — Yee & Associates, P.C.; David A. Mims, Jr.

(57) ABSTRACT

A method and apparatus for managing data packets in a network data processing system. The data processing system monitors for the data packets on the network data processing system. The data processing system sends a response data packet to a source endpoint that sent a request data packet in response to detecting the request data packet in the data packets requesting a first identifier for a first device at a target endpoint in the network data processing system. A response data packet has a selected identifier for a selected device in the monitoring data processing system. The data processing system processes a set of data packets in response to detecting the set of data packets having the selected identifier. The data processing system sends the set of data packets to the target endpoint with the first identifier for the first device in place of the selected identifier.

17 Claims, 5 Drawing Sheets

DATA PACKET INTERCEPTION SYSTEM

BACKGROUND

1. Field

The present disclosure relates generally to an approved data processing system and, in particular, to a method and apparatus for managing data packets. Still more particularly, the present disclosure relates to a method and apparatus for intercepting data packets on a network data processing system.

2. Description of the Related Art

In a network data processing system, information is sent between different endpoints in a network using data packets. These endpoints may be, for example, a server computer, a client computer, or some other type of data processing system. A data packet is a structure in which data is transported. A data packet typically includes a header and a payload. A source endpoint may generate a data packet and send the data packet onto the network for receipt by a target endpoint.

In addition to a target endpoint receiving a data packet, other components may inspect the data packets while they are traveling from a source endpoint to a target endpoint. For example, a firewall, an intrusion detection device, and/or other similar components may inspect data packets that are sent between source endpoints and target endpoints on a network data processing system.

In some cases, the components that inspect the packets require a logical or physical change to the network data processing system to allow for the inspection of the data packets. These types of changes, however, may require additional time and expense than desired to allow for the implementation of a component that inspects data packets.

For example, a firewall is a component designed to block unauthorized access to different endpoints in a network data processing system. For example, firewalls are typically used to prevent unauthorized users from accessing networks connected to the internet. Data packets entering or leaving a network typically pass through a firewall. The firewall inspects each data packet and blocks those data packets that do not meet specified security criteria.

Adding a firewall to a local area network may require changing connections such that the firewall is located between the local area network and another network, such as the Internet or a wide area network. These types of changes may increase the cost and/or complexity of the network.

SUMMARY

The different illustrative embodiments provide a method, a data processing system, and a computer program product for managing data packets in a network data processing system. The monitoring data processing system monitors for the data packets on the network data processing system. The monitoring data processing system sends a response data packet to a source endpoint that sent a request data packet in response to detecting the request data packet in the data packets requesting a first identifier for a first device at a target endpoint in the network data processing system. A response data packet has a selected identifier for a selected device in the monitoring data processing system. The monitoring data processing system processes a set of data packets in response to detecting the set of data packets having the selected identifier. The monitoring data processing system sends the set of data packets to the target endpoint with the first identifier for the first device in place of the selected identifier for the selected device.

DETAILED DESCRIPTION

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination of the foregoing. In the context of this document, a computer readable storage medium may be any tangible medium that can contain or store a program for use by or in connection with an instruction processing system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction processing system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object-oriented programming language, such as Java, Smalltalk, C++, or the like and conventional procedural programming languages, such as the "C" programming language or similar programming languages. The program code may perform entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowcharts and/or block diagrams of methods, apparatus (systems), and computer program products according to embodiments of the invention. It will be understood that each block of the flowcharts and/or block diagrams, and combinations of blocks in the flowcharts and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer-implemented process such that the instructions which run on the computer or other programmable apparatus provide processes for implementing the functions/acts specified in the flowchart and/or block diagram block or blocks.

Figure 1:
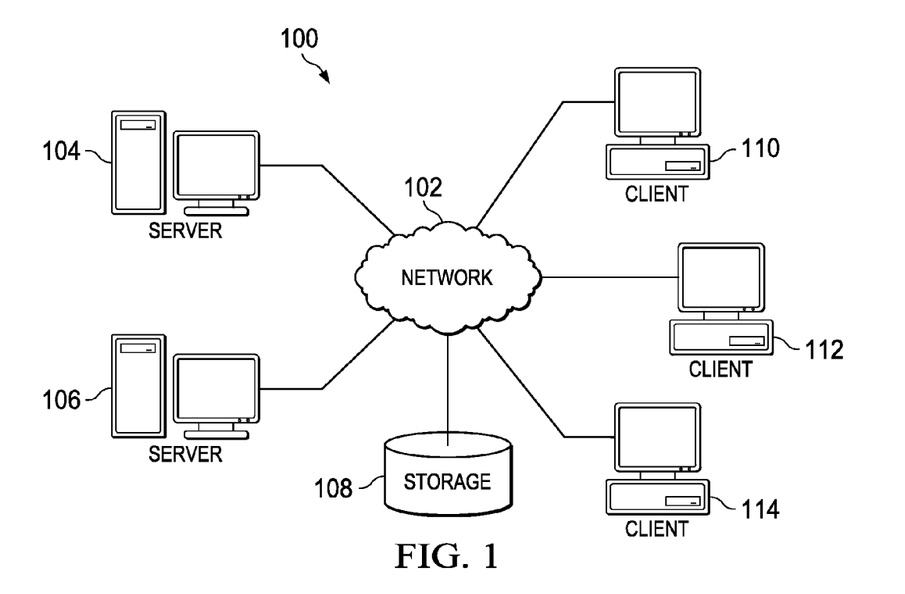
FIG. 1 is an illustrative diagram of a data processing environment in which illustrative embodiments may be implemented.

With reference now to the figures and, in particular, with reference to FIG. 1, an illustrative diagram of a data processing environment is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers or network computers. In the depicted example, server computer 104 provides information, such as boot files, operating system images, and applications to client computers 110, 112, and 114. Client computers 110, 112, and 114 are clients to server computer 104 in this example. The different computers illustrated are examples of endpoints that may send and receive data packets. Additionally, a computer, such as, for example, one or more of these computers may be configured to intercept and inspect data packets. Part of this configuration may include physical changes to network data processing system 100 to allow for the interception of data packets. Network data processing system 100 may include additional server computers, client computers, and other devices not shown.

Program code located in network data processing system 100 may be stored on a computer recordable storage medium and downloaded to a data processing system or other device for use. For example, program code may be stored on a computer recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN).

Figure 2:
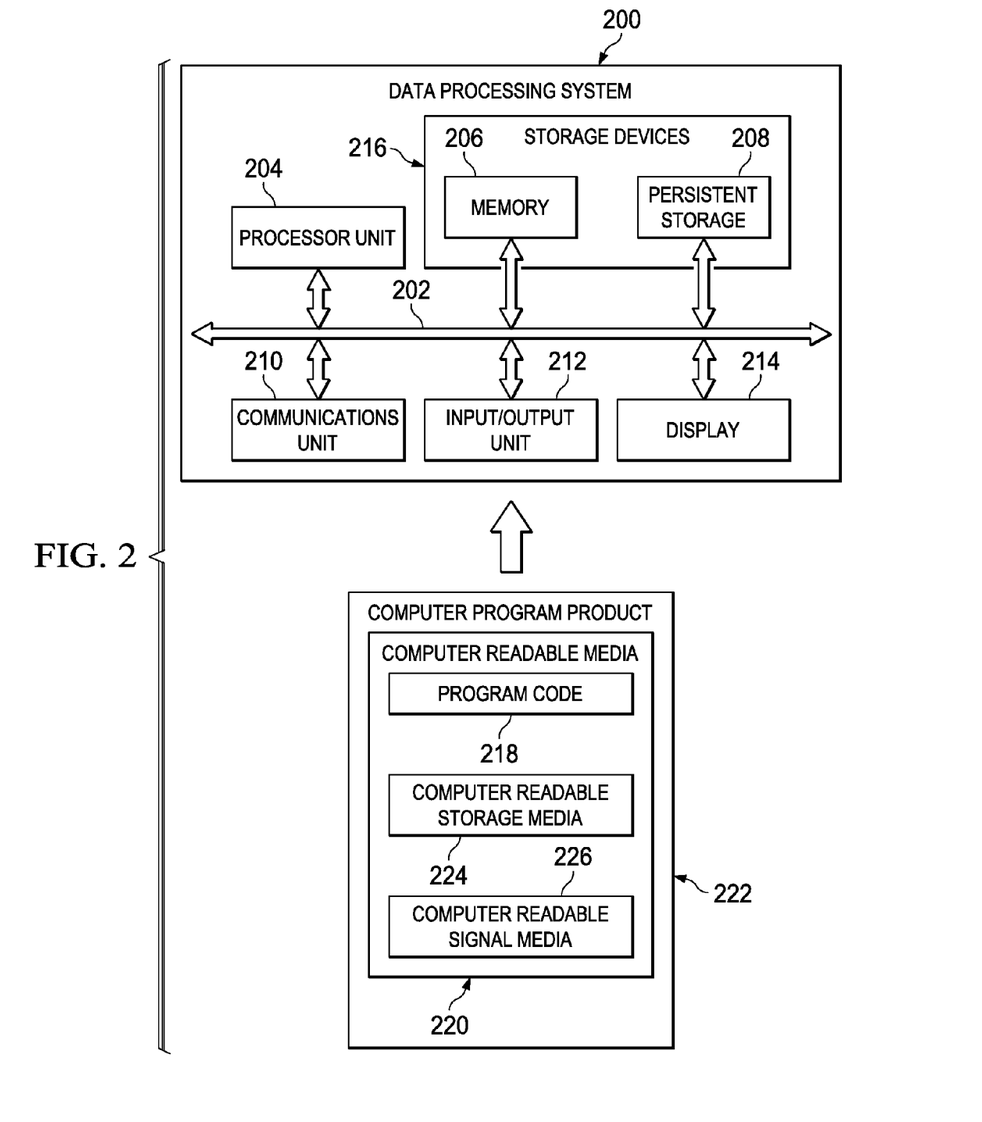
FIG. 2 is an illustration of a data processing system in accordance with an illustrative embodiment.

Turning now to FIG. 2, an illustration of a data processing system is depicted in accordance with an illustrative embodiment. In this illustrative example, data processing system 200 includes communications fabric 202, which provides communications between processor unit 204, memory 206, persistent storage 208, communications unit 210, input/output (I/O) unit 212, and display 214. Data processing system 200 may be used to implement different endpoints in network data processing system 100 in FIG. 1. For example, data processing system 200 also may be used to implement a laptop computer, a mobile phone, a router, a proxy server computer, a client computer, and other suitable types of endpoints.

Processor unit 204 serves to run instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Storage devices 216 may also be referred to as computer readable storage devices in these examples. Memory 206, in these examples, may be, for example, a random access memory or any other suitable volatile or non-volatile storage device. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 to be processed by processor unit 204. The processes of the different embodiments may be performed by processor unit 204 using computer-implemented instructions, which may be located in a memory, such as memory 206.

These instructions are referred to as program code, computer usable program code, or computer readable program code that may be read and run by a processor in processor unit 204. The program code in the different embodiments may be embodied on different physical or computer readable storage media, such as memory 206 or persistent storage 208.

Program code 218 is located in a functional form on computer readable media 220 that is selectively removable and may be loaded onto or transferred to data processing system 200 for processing by processor unit 204. Program code 218 and computer readable media 220 form computer program product 222 in these examples. In one example, computer readable media 220 may be computer readable storage media 224 or computer readable signal media 226. Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200. In these illustrative examples, computer readable storage media 224 is a non-transitory computer readable storage medium.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache, such as found in an interface and memory controller hub that may be present in communications fabric 202.

The different illustrative embodiments recognize and take into account a number of different considerations. For example, the different illustrative embodiments recognize and take into account that it would be desirable to avoid having to make physical or logical changes to a network when deploying a component to intercept and/or inspect data packets. The different illustrative embodiments recognize and take into account that, without needing logical or physical changes to a network, deploying a component to inspect data packets may take less time and less expense. The different illustrative embodiments also recognize and take into account that, without logical or physical changes to the network, the complexity of a network data processing system may be reduced.

Thus, the different illustrative embodiments provide a method and apparatus for managing data packets in a network data processing system. A monitoring data processing system monitors for data packets on the network data processing system. In response to detecting any data packets requesting an identifier for a first device at a target endpoint in a network data processing system, the monitoring data processing system sends a response data packet to the source endpoint that sent the request data packet. The response data packet has a selected identifier for a selected device in the monitoring data processing system. In response to detecting a set of data packets having the selected identifier, the monitoring data processing system processes the set of data packets. In these illustrative examples, the monitoring data processing system sends the set of data packets with the first identifier in place of the selected identifier to the endpoint.

Figure 3:
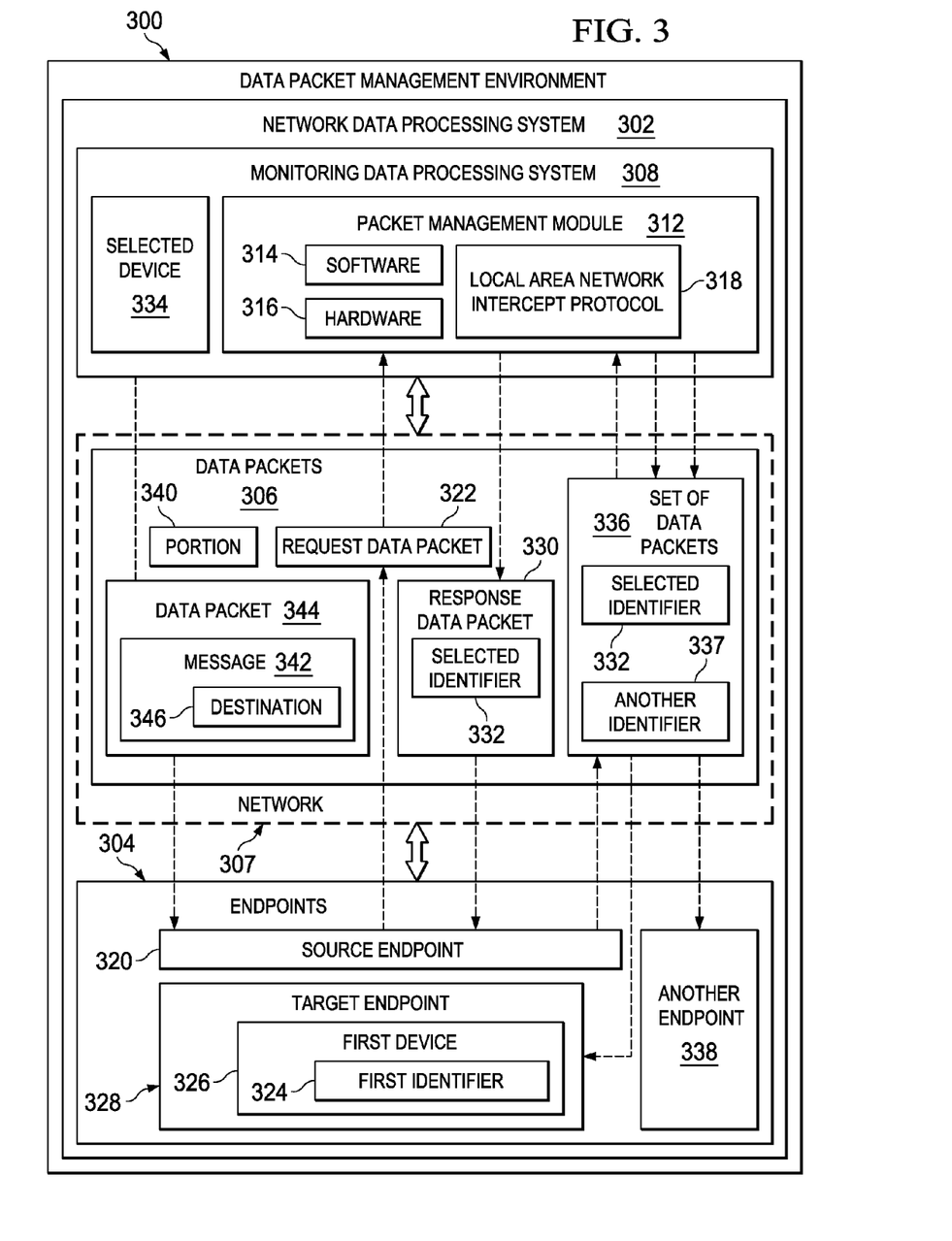
FIG. 3 is an illustration of a data packet management environment in accordance with an illustrative embodiment.

With reference now to FIG. 3, an illustration of a data packet management environment is depicted in accordance with an illustrative embodiment. Data packet management environment 300 includes network data processing system 302. In this illustrative example, network data processing system 302 may be implemented using network data processing system 100 in FIG. 1.

As depicted, network data processing system 302 in data packet management environment 300 includes endpoints 304. In these illustrative examples, endpoints 304 are any hardware and/or software devices that perform at least one of receiving a data packet and sending a data packet in data packets 306.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C, or item B and item C.

In these illustrative examples, data packets 306 may be sent onto network 307 for a transport to endpoints 304. Monitoring data processing system 308 monitors for data packets 306 on network 307 in network data processing system 302. Monitoring data processing system 308 may intercept some or all of data packets 306. In this illustrative example, monitoring data processing system 308 may be considered an endpoint.

The addition of monitoring data processing system 308 to network data processing system 302 does not require any physical or logical changes to the configuration of network data processing system 302. In other words, monitoring data processing system 308 does not have to be physically interposed between different endpoints in endpoints 304 to intercept or process data packets 306.

Packet management module 312 is located in monitoring data processing system 308 in these examples. Packet management module 312 may be implemented using at least one of software 314, hardware 316, or a combination of the two. In these examples, packet management module 312 uses local area network intercept protocol 318. Local area network intercept protocol 318 is used by packet management module 312 on monitoring data processing system 308 to ensure that some or all of data packets 306 are sent to monitoring data processing system 308.

For example, source endpoint 320 in endpoints 304 generates request data packet 322 in data packets 306. Request data packet 322 requests first identifier 324 for first device 326 at target endpoint 328 in endpoints 304. First identifier 324 is an identifier for first device 326 at target endpoint 328. In these illustrative examples, first identifier 324 may be, for example, a media access control (MAC) address. Of course, first identifier 324 may be any identifier used to identify first device 326.

In response to detecting request data packet 322, packet management module 312 in monitoring data processing system 308 sends response data packet 330 to source endpoint 320. Response data packet 330 has selected identifier 332. Selected identifier 332 identifies selected device 334 in monitoring data processing system 308. In this example, selected identifier 332 may be a media access control address that identifies selected device 334 in monitoring data processing system 308. In these illustrative examples, selected device 334 may be, for example, without limitation, a network adapter in monitoring data processing system 308 receiving request data packet 322.

In these depicted examples, packet management module 312 may send response data packet 330 to source endpoint 320 to initiate communications with packet management module 312. These communications may take the place of communications between source endpoint 320 and target endpoint 328. For example, without limitation, selected identifier 332 is sent to source endpoint 320 as a response to the request for first identifier 324. In this manner, source endpoint 320 uses selected identifier 332 for selected device 334 for sending data to target endpoint 328 in the place of first identifier 324 for first device 326.

Source endpoint 320 uses selected identifier 332 as the response to the request for first identifier 324 and to begin communications with target endpoint 328. For example, source endpoint 320 uses selected identifier 332 in response data packet 330 to generate set of data packets 336 having selected identifier 332. A set of data packets is one or more data packets. Set of data packets 336 may include any information that is to be sent to target endpoint 328. However, in these illustrative examples, set of data packets 336 is sent to selected device 334 in monitoring data processing system 308 based on the inclusion of selected identifier 332 in set of data packets 336.

When packet management module 312 in monitoring data processing system 308 detects set of data packets 336 with selected identifier 332, packet management module 312 may process set of data packets 336. This processing may include a number of different types of operations. For example, without limitation, these operations may include those performed by a firewall, a malware protection device, and/or other suitable types of operations.

For example, packet management module 312 in monitoring data processing system 308 may determine whether to send set of data packets 336 to target endpoint 328. If set of data packets 336 is to be sent to target endpoint 328, set of data packets 336 may then be sent onto network 307 of network data processing system 302 with first identifier 324 in place of selected identifier 332. In this manner, set of data packets 336 is then sent to target endpoint 328.

If a determination is made that set of data packets 336 is not to be sent to target endpoint 328, set of data packets 336 may be discarded. In other illustrative examples, set of data packets 336 may be redirected to another endpoint 338 by placing another identifier 337 for another endpoint 338 in set of data packets 336, instead of selected identifier 332, and sending set of data packets 336 to another endpoint 338 through network 307.

In these illustrative examples, portion 340 of data packets 306 is data packets with target endpoint 328 being the destination for portion 340 of data packets 306 when packet management module 312 in monitoring data processing system 308 intercepts portion 340 of data packets 306 for target endpoint 328. The interception is performed without target endpoint 328 responding to the request in request data packet 322.

Request data packet 322 may be an address resolution protocol (ARP) request, a neighbor domain (ND) request, or some other suitable request. With an address resolution protocol request, request data packet 322 may include an internet protocol address for target endpoint 328. The request is for the endpoint identified by the internet protocol address to respond with a media access control address for a device in the endpoint.

In these illustrative examples, target endpoint 328 does not respond to this request in request data packet 322 even though target endpoint 328 has the internet protocol address in request data packet 322. In other words, target endpoint 328 is configured to not respond to the address resolution protocol request.

Instead, data packets sent onto network 307 with the internet protocol address for target endpoint 328 are responded to by packet management module 312 in monitoring data processing system 308. Packet management module 312 may be configured to respond to portion 340 of data packets 306 for target endpoint 328 in a number of different ways.

If target endpoint 328 is aware of the presence of packet management module 312 in monitoring data processing system 308, target endpoint 328 may communicate with packet management module 312. This communication may configure packet management module 312 to intercept portion 340 of data packets 306 that are directed towards target endpoint 328.

For example, target endpoint 328 may be aware of or capable of discovering the presence of packet management module 312 using local area network intercept protocol 318. Target endpoint 328 may communicate with packet management module 312 to cause packet management module 312 to respond to portion 340 of data packets 306 that are directed towards target endpoint 328.

If target endpoint 328 is capable of discovering the presence of packet management module 312 in monitoring data processing system 308, a number of different processes may be used to discover or identify the presence of packet management module 312.

For example, monitoring data processing system 308 may use a well-known internet protocol address. As another example, the internet protocol address of monitoring data processing system 308 may be returned by a dynamic host configuration protocol server. A service location protocol also may be used to locate monitoring data processing system 308. As yet another example, a multicast protocol also may be used to discover the presence of packet management module 312 in monitoring data processing system 308. Of course, any process or protocol may be used to identify the presence of packet management module 312 in monitoring data processing system 308.

In communicating with packet management module 312, target endpoint 328 may register with packet management module 312. In other words, target endpoint 328 may send information to packet management module 312 that configures packet management module 312 to respond to portion 340 of data packets 306 that are directed towards target endpoint 328 by other target endpoints in endpoints 304.

With this process, target endpoint 328 may provide the identification of information to be inspected by packet management module 312, and an identifier of the device at target endpoint 328 that may be used to reach target endpoint 328. In these illustrative examples, the information to be inspected may include, for example, without limitation, a source internet protocol address, a destination protocol internet protocol address, a protocol used to transmit data packets to be inspected at a source port, a destination port, and any other suitable parameter to identify information to be inspected by packet management module 312.

Portion 340 of data packets 306 may be all of the data packets directed towards target endpoint 328. In some illustrative examples, portion 340 of data packets 306 may be only some of the data packets directed towards target endpoint 328.

For example, target endpoint 328 may negotiate with packet management module 312 in monitoring data processing system 308 to have packet management module 312 only intercept some types of data packets 306 directed to target endpoint 328. As an illustrative example, portion 340 may be data packets that are for a particular type of protocol. For example, portion 340 may include data packets sent using hypertext transfer protocol (HTTP), file transfer protocol (FTP), and/or some other combination of data packets.

If target endpoint 328 is not aware of packet management module 312, packet management module 312 in monitoring data processing system 308 may be configured to process portion 340 of data packets 306 for target endpoint 328. For example, without limitation, target endpoint 328 may be identified for interception in packet management module 312 by including target endpoint 328 in a list or some other data structure for use by packet management module 312. For example, target endpoint 328 may be included in the list through the use of the internet protocol address for target endpoint 328. Any other endpoint for which data packets should be inspected also may have their internal protocol addresses included in this list.

In this depicted example, target endpoint 328 may be configured to not respond to requests, such as those in request data packet 322. Target endpoint 328 may also be configured to not advertise ownership of the internet protocol address for target endpoint 328. Further, target endpoint 328 also may not respond to requests for information associated with the internet protocol address for target endpoint 328. For example, without limitation, address resolution protocol requests and neighbor discovery requests are not responded to by target endpoint 328.

Additionally, in some illustrative examples, packet management module 312 may only desire to inspect some of data packets 306 in portion 340 that are directed to target endpoint 328. In other words, packet management module 312 may not desire to inspect all of the data packets in portion 340 having an internet protocol address for target endpoint 328. In this instance, packet management module 312 may not forward these data packets to target endpoint 328. Forwarding of data packets to target endpoint 328 may use more processing resources than desired at monitoring data processing system 308.

Instead, packet management module 312 may send message 342 in data packet 344 to source endpoint 320 to resend the data packet to destination 346 in message 342. In this example, destination 346 is target endpoint 328. Of course, destination 346 could be another endpoint, depending on the particular implementation.

For example, packet management module 312 may send data packet 344 to source endpoint 320 with a request that source endpoint 320 send future data packets directly to target endpoint 328 instead of packet management module 312. In particular, packet management module 312 may send a redirect message containing first identifier 324 for target endpoint 328 in data packet 344 to source endpoint 320 indicating that all future data packets are to be sent directly from source endpoint 320 to target endpoint 328.

The illustration of data packet management environment 300 in FIG. 3 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, an additional number of packet management modules may be present in addition to packet management module 312. These packet management modules may be present on monitoring data processing system 308 or other data processing systems that are configured to intercept one or more of data packets 306. Of course, additional endpoints, in addition to source endpoint 320 and target endpoint 328, may be present on network data processing system 302. In addition, the different endpoints may be fixed or mobile using wired or wireless communications links, depending on the particular implementation.

In these examples, the data packets include internet protocol addresses for endpoints. Of course, other illustrative embodiments may use other types of addressing schemes other than the internet protocol address.

Figure 4:
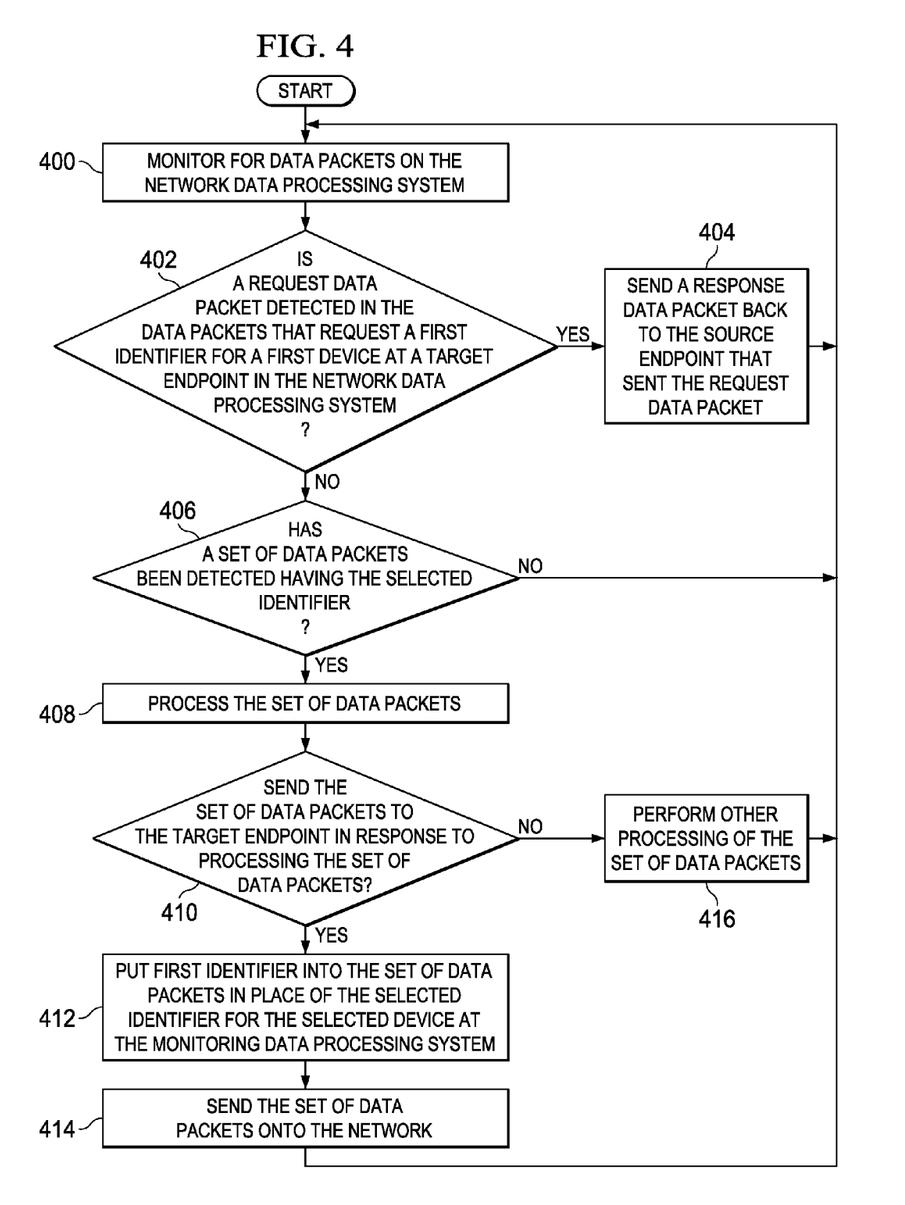
FIG. 4 is a flowchart of a process for managing data packets in a network data processing system in accordance with an illustrative embodiment.

With reference now to FIG. 4, a flowchart of a process for managing data packets in a network data processing system is depicted in accordance with an illustrative embodiment. In this illustrative example, the process depicted in FIG. 4 may be implemented in data packet management environment 300 in FIG. 3. More specifically, this process may be implemented in software or hardware for packet management module 312 on monitoring data processing system 308 in FIG. 3.

The process begins by monitoring for data packets on the network data processing system (step 400). A determination is made as to whether a request data packet is detected in the data packets that request a first identifier for a first device at a target endpoint in the network data processing system (step 402). In this illustrative example, the request data packet is directed towards an internet protocol address for a target endpoint. The packet management module is configured to respond to this internet protocol address for the target endpoint.

In operation 402, if the request data packet is detected, the process sends a response data packet back to the source endpoint that sent the request data packet (step 404), with the process then returning to step 400. The response data packet has a selected identifier for a selected device in the monitoring data processing system in which the process runs. In these examples, the selected identifier is a media access control address for the adapter receiving the request data packet. As a result, any data packets generated by the source endpoint will be identified by a packet management module for processing.

With reference again to step 402, if the request data packet that requests a first identifier for a first device at a target endpoint is not detected, a determination is made as to whether a set of data packets has been detected having the selected identifier (step 406). If the set of data packets is not detected, the process returns to step 400.

With reference again to operation 406, if the set of data packets having the selected identifier has been detected in step 406, then the set of data packets is processed (step 408). A determination is made as to whether the set of data packets is to be sent to the target endpoint in response to processing the set of data packets (step 410). The processing of step 410 may take a number of different forms. The processing may include determining whether the set of data packets includes information that should not be sent to the target endpoint. For example, the set of data packets may be inspected for viruses, prohibited information, or other types of information. Additionally, the processing may include changing data in the data packet. For example, prohibited data, or data considered to be malware, may be removed from the data packet.

With reference again to step 410, if the set of data packets is to be sent to the target endpoint, the first identifier for the target endpoint is put into the set of data packets in place of the selected identifier for the selected device at the monitoring data processing system (step 412). In step 412, the first identifier is a media access control address for the first device at the target endpoint. The process then sends the set of data packets onto the network (step 414), with the process returning to step 400.

With reference again to step 410, if the set of data packets is not to be sent to the target endpoint, other processing of the set of data packets is performed (step 416), with the process returning to step 400. This other processing may take a number of different forms. For example, the set of data packets may be discarded. As another illustrative example, the set of data packets may be directed to another endpoint other than the target endpoint.

Figure 5:
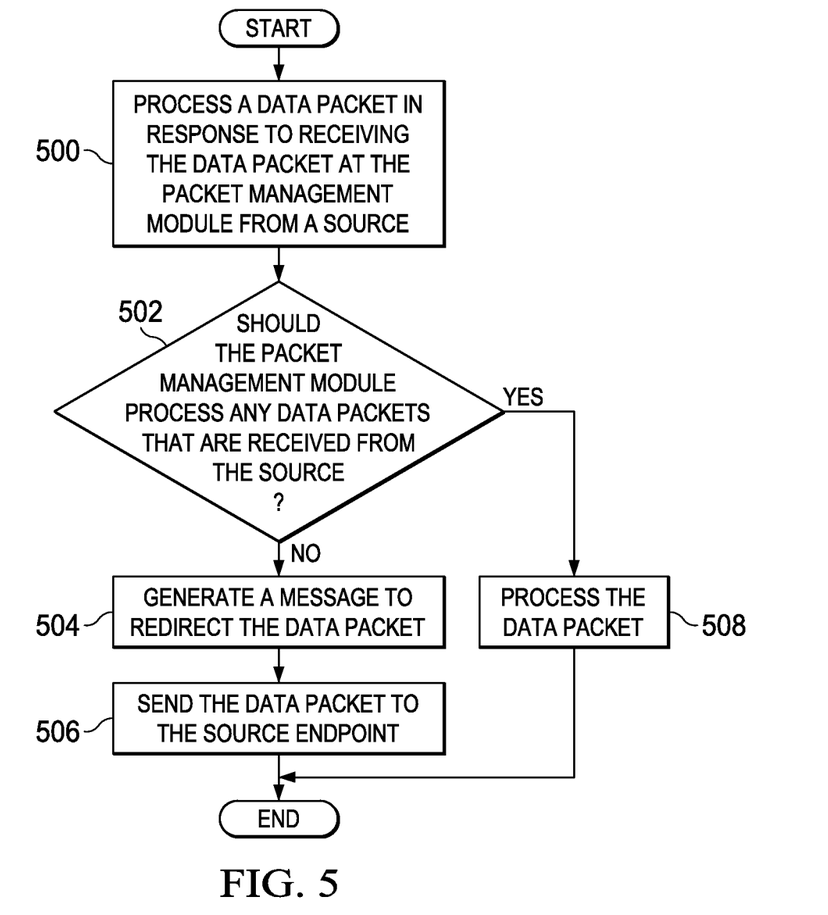
FIG. 5 is a flowchart of a process for managing data packets in accordance with an illustrative embodiment.

With reference now to FIG. 5, a flowchart of a process for managing data packets is depicted in accordance with an illustrative embodiment. The process illustrated in FIG. 5 may be implemented in packet management module 312 on monitoring data processing system 308 in FIG. 3 in these examples.

The process begins by processing a data packet in response to receiving the data packet at the packet management module from a source (step 500). In these illustrative examples, the data packet received by the packet management module may be, for example, an address resolution protocol request or a neighbor discovery request.

Thereafter, a determination is made as to whether the packet management module should process any data packets that are received from the source (step 502). In step 502, the determination is made for the data packet received in step 500 and for any future data packets received from the source.

If the packet management module determines that data packets received from the source are not to be processed, the process generates a message to redirect the data packet (step 504). With requests, such as address resolution protocol requests and neighbor discovery requests, the message generated in step 504 causes the source of the data packet to send the data packet to a target address. For example, the message generated in step 504 may include a source internet protocol address and/or a destination internet protocol address. The destination internet protocol address is the address of the target endpoint, and the source internet protocol is the address of the source of the data packet. The process then sends the data packet to the source endpoint (step 506), with the process terminating thereafter.

With reference again to step 502, if the packet management module is to process the data packet, processing of the data packet occurs (step 508), with the process terminating thereafter. Further, any future data packets received from the source are also processed until a determination is made to not process the data packets received from the source. In some illustrative examples, when the source endpoint is not able to support the redirect message, the packet management module sends the data packet directly to the target address.

In this manner, the redirect message may require less use of processing resources as compared to forwarding the message to the target endpoint. For example, the redirect message reduces processing loads on the packet management module, reducing processing loads on the local area network (LAN) switch, if one is used, and reduces the amount of time needed to send data packets to a destination. In particular, without a redirect message, the local area network switch sees the data packet twice, as compared to just once when the redirect message is used.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowcharts, and combinations of blocks in the block diagrams and/or flowcharts, can be implemented by special purpose hardware-based systems that perform the specified functions or acts, or combinations of special purpose hardware and computer instructions.

Thus, the different illustrative embodiments provide a method and apparatus for managing data packets. In the different illustrative examples, monitoring is performed for data packets on a network data processing system. In response to detecting a request data packet in a data packet requesting a first identifier for a first device at a target endpoint in the network data processing system, a response data packet is sent to the source endpoint that sent the request data packet. The response data packet has a selected identifier for the selected device in the monitoring data processing system. In response to detecting a set of data packets having the selected identifier, the set of data packets is processed. The process then sends the set of data packets with the first identifier in place of the selected identifier for the selected device.

In this manner, a component, such as packet management module 312 in monitoring data processing system 308 in FIG. 3, may intercept and inspect or perform other processing of data packets without requiring physical or logical changes to the configuration of a network data processing system. In these illustrative examples, the component on which the data packet interception and processing is to occur is configured to identify data packets directed towards particular endpoints. Additionally, the endpoints for which interception and processing is to be formed are configured to not respond to requests from source endpoints in these illustrative examples.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for managing data packets in a network data processing system, the method comprising:
monitoring, by a monitoring data processing system, for the data packets on the network data processing system;
responsive to detecting, by the monitoring data processing system, a request data packet in the data packets requesting a first identifier for a first device at a target endpoint in the network data processing system, sending, by the monitoring data processing system, a response data packet to a source endpoint that sent the request data packet, wherein the response data packet has a selected identifier for a selected device in the monitoring data processing system;
responsive to detecting, by the monitoring data processing system, a set of data packets having the selected identifier, processing, by the monitoring data processing system, the set of data packets;
responsive to processing the set of data packets, determining, by the monitoring data processing system, whether to send the set of data packets to the target endpoint;
responsive to a determination that the set of data packets is to be sent to the target endpoint, sending, by the monitoring data processing system, the set of data packets to the target endpoint with the first identifier for the first device in place of the selected identifier for the selected device; and
responsive to a determination that the set of data packets is not to be sent to the target endpoint, preventing, by the monitoring data processing system, sending, by the monitoring data processing system, the set of data packets with the first identifier in place of the selected identifier to the target endpoint, and sending, by the monitoring data processing system, the set of data packets with another identifier for another endpoint in place of the selected identifier for the target endpoint.

2. The method of claim 1 further comprising:
responsive to the determination that the set of data packets is not to be sent to the target endpoint, discarding, by the monitoring data processing system, the set of data packets.

3. The method of claim 1 further comprising:
identifying a number of endpoints for which a response with the first identifier for the first device to a data packet sent from any of the number of endpoints is made.

4. The method of claim 3, wherein the step of identifying the number of endpoints for which the response with the first identifier for the first device to the data packet sent from the any of the number of endpoints is made comprises:
negotiating between the monitoring data processing system and the number of endpoints for the monitoring data processing system to respond with the first identifier for the first device in response to detecting the data packet sent from the any of the number of endpoints.

5. The method of claim 3, wherein the step of identifying the number of endpoints for which the response with the first identifier for the first device to the data packet sent from the any of the number of endpoints is made comprises:

identifying the number of endpoints for which the response with the first identifier for the first device to the data packet sent from the any of the number of endpoints is made using a data structure containing list addresses for the number of endpoints.

6. The method of claim 1, wherein the first device is selected from one of a hardware device and a virtual device.

7. The method of claim 1, wherein the request data packet is selected from one of an address resolution protocol request and a neighbor domain request.

8. The method of claim 1 further comprising:

receiving a data packet from the source endpoint;

responsive to receiving the data packet from the source endpoint, determining whether to inspect the data packet; and responsive to a determination that the data packet is not to be inspected, sending a message to the source endpoint to resend the data packet to a destination for the data packet.

9. A data processing system comprising:

a bus;

a communications unit connected to the bus;

a storage device connected to the bus, wherein the storage device includes program code; and a processor unit connected to the bus, wherein the processor unit runs the program code to monitor for data packets on a network data processing system; send a response data packet to a source endpoint that sent a request data packet in response to detecting the request data packet in the data packets requesting a first identifier for a first device at a target endpoint in the network data processing system, wherein the response data packet has a selected identifier for a selected device in the data processing system; process a set of data packets in response to detecting the set of data packets having the selected identifier; determine whether to send the set of data packets to the target endpoint in response to processing the set of data packets; send the set of data packets to the target endpoint with the first identifier for the first device in place of the selected identifier for the selected device in response to a determination that the set of data packets is to be sent to the target endpoint, and in response to a determination that the set of data packets is not to be sent to the target endpoint, prevent sending the set of data packets with the first identifier in place of the selected identifier to the target endpoint, and send the set of data packets with another identifier for another endpoint in place of the selected identifier for the target endpoint.

10. The data processing system of claim 9, wherein the processor unit further runs the program code to discard the set of data packets in response to the determination that the set of data packets is not to be sent to the target endpoint.

11. The data processing system of claim 9, wherein the processor unit further runs the program code to identify a number of endpoints for which a response with the first identifier for the first device to a data packet sent from any of the number of endpoints is made.

12. The data processing system of claim 11, wherein in running the program code to identify the number of endpoints for which the response with the first identifier for the first device to the data packet sent from the any of the number of endpoints is made, the processor unit runs the program code to negotiate between the data processing system and the number of endpoints for the data processing system to respond with the first identifier for the first device in response to detecting the data packet sent from the any of the number of endpoints.

13. The data processing system of claim 11, wherein in running the program code to identify the number of endpoints for which the response with the first identifier for the first device to the data packet sent from the any of the number of endpoints is made, the processor unit runs the program code to identify the number of endpoints for which the response with the first identifier for the first device to the data packet sent from the any of the number of endpoints is made using a data structure containing list addresses for the number of endpoints.

14. The data processing system of claim 9, wherein the first device is selected from one of a hardware device and a virtual device.

15. The data processing system of claim 9, wherein the request data packet is selected from one of an address resolution protocol request and a neighbor domain request.

16. The data processing system of claim 9, wherein the processor unit further runs the program code to receive a data packet from the source endpoint; determine whether to inspect the data packet in response to receiving the data packet from the source endpoint; and send a message to the source endpoint to resend the data packet to a destination for the data packet in response to a determination that the data packet is not to be inspected.

17. A computer program product for managing data packets in a network data processing system, the computer program product comprising:

a non-transitory computer readable storage medium;

program code, stored on the computer readable storage medium, for monitoring for the data packets on the network data processing system;

program code, stored on the computer readable storage medium, for sending a response data packet to a source endpoint that sent a request data packet in response to detecting the request data packet in the data packets requesting a first identifier for a first device at a target endpoint in the network data processing system, wherein the response data packet has a selected identifier for a selected device;

program code, stored on the computer readable storage medium, for processing a set of data packets in response to detecting the set of data packets having the selected identifier;

program code, stored on the computer readable storage medium, responsive to processing the set of data packets, for determining whether to send the set of data packets to the target endpoint;

program code, stored on the computer readable storage medium, responsive to a determination that the set of data packets is to be sent to the target endpoint, for sending the set of data packets to the target endpoint with the first identifier for the first device in place of the selected identifier for the selected device; and program code, stored on the computer readable storage medium, responsive to a determination that the set of data packets is not to be sent to the target endpoint, for preventing sending the set of data packets with the first identifier in place of the selected identifier to the target endpoint, and for sending the set of data packets with another identifier for another endpoint in place of the selected identifier for the target endpoint.

* * * * *